Patented Dec. 7, 1926.

1,610,203

UNITED STATES PATENT OFFICE.

BRADFORD S. COVELL, OF MERIDEN, CONNECTICUT, ASSIGNOR TO THE CONNECTICUT TELEPHONE & ELECTRIC COMPANY, INCORPORATED, OF MERIDEN, CONNECTICUT, A CORPORATION OF CONNECTICUT.

INSULATING COMPOSITION, PROCESS, AND ARTICLE.

No Drawing.    Application filed August 15, 1922. Serial No. 582,076.

One object of my invention is to provide a composition from which cold molded articles having high heat resistance qualities may be readily made. Another object is to produce articles which are non-conductors of electricity and which will stand temperatures of upwards of 1,000° F. without weakening or combustion. Another object is to provide a composition and process for making such articles at a minimum of expense. Another object is to provide a composition which after mixing will keep in proper condition for a considerable period of time before molding so that substantial quantities may be made up at one time and molded as occasion may require. Another object is to provide a composition and process for making hard refractory articles without requiring special heated molds or high fusion temperature.

In carrying out the invention I mix a relatively coarse cementitious material with a finely divided filler and a binding material. I also prefer to use a comparatively small percentage of asbestos fibre for reenforcement and also a fusible salt which tends to maintain the composition in proper working condition and to give added strength to the finished article. This composition may be molded in suitable dies under pressure at an ordinary atmospheric temperature. The molded articles are then slowly heated to drive off moisture at a moderate temperature until they assume a constant weight.

The cement which I prefer to use is commonly termed a hydraulic cement whose ingredients combine chemically in the presence of water. The most desirable grade or type of cement is one which is commonly known as a high temperature or refractory cement. The best results are obtained from the use of a comparatively coarse cement. An analysis of one satisfactory cement showed 18% would pass through a screen having 100 meshes to the inch, 30% through an 80 mesh screen, 20% through a 60 mesh screen, 16% through a 40 mesh screen and 6% through a 20 mesh screen. It has been found that where the cement was too fine the articles would crack.

The so-called filler performs a mechanical function of filling in the interstices of the coarser cement. The preferred material for this purpose is slate flour having a fineness of say 300 mesh. Other argillaceous or clayey materials such as rotten stone, talc or silica may be substituted for the slate in whole or in part.

The asbestos referred to is of fibrous character with the fibres averaging about 1/4 inch in length, the exact length, however, is unimportant, in fact finely ground asbestos might be used as a part of the filler although in such form it has little or no reinforcing characteristics.

A neutral or basic salt which does not combine with, or absorb, water chemically, i. e., which will not form a hydrated compound when mixed, and which will fuse below the temperature to which the piece is to be subjected in use, is preferably used. Examples are sodium fluoride and sodium borate (borax). This prevents rapid drying of the unmolded powder and by fusing and combining with other ingredients through use at high temperatures, strengthens the piece. A mixture of two or more salts may be used.

As a binder I prefer to employ waterglass in the form of sodium silicate dissolved in water and having a specific gravity of approximately 1.38.

As one example of a satisfactory composition I would suggest the following proportions by weight:

|  | Per cent. |
|---|---|
| Cement | 48 |
| Asbestos fibre | 2 |
| Filler $Silica$ | 28 |
| Fusible salt $Na_2F$ | 4 |
| Waterglass solution $Na_2SiO_3$ | 18 |

The desired proportions of cement and asbestos are first weighed and thoroughly mixed together in a mechanical mixer. The fusible salt and inert filler are then added and the mixing continues. When the mass is substantially homogeneous the waterglass solution is slowly added and the mixing continues until a uniform texture is produced.

The composition is adapted to be molded in dies such as are commonly employed for cold molding insulation. Preferably the punches and dies are well moistened with glycerine or other lubricant. The molding is preferably done under high pressure for instance, in a standard type of 10 ton press. The pressure, however, should be applied somewhat gradually and the punch should preferably be lowered but once. I have found that too sudden or repeated blows tends to cause cracks.

After the pieces are molded they are heated slowly so as to remove the excess of water and baked until they assume a constant weight. This heating and baking may be carried out in an ordinary oven. The amount of baking and the temperature will depend somewhat upon the composition and somewhat upon the nature, size and shape of the articles. Comparatively small articles may be heated for instance gradually from room temperature to say 220° F. which should take about an hour. The temperature may then be held at approximately 220° F. for a period of another hour and the temperature then gradually raised to say 300° to 350° F. during another hour. The baking at this higher temperature is preferably continued for a period of say another hour.

The finished pieces withstand temperatures to upwards of 2000° F. and it has been found that the strength increases with repeated heating.

Although I have mentioned a single specification for a suitable composition it should be understood that I consider the proportions may be varied and that substitutions may be made. For instance, the proportion of cement may vary from 35% to 61% of the total weight, the filler may vary from say 41% to 15% and the fusible salt may be used in larger amounts, say 8% when greater strength is desired and good appearance is not so important. Generally speaking the total of the other ingredients should remain approximately as above indicated but with a larger percentage of cement the waterglass solution may be somewhat increased. I also consider that the percentage of asbestos may be increased in some cases. Where it is not necessary to keep the composition in its unmolded state for any length of time the percentage of fusible salt may be decreased. The powder will keep almost indefinitely in a desiccator where the humidity is controlled.

I claim:

1. A cold moldable composition comprising cement 35 to 61%, slate flour 41 to 15%, and waterglass solution approximately 18%.

2. A cold moldable composition comprising approximately 50% of cement and asbestos, and 50% of slate flour, a fusible salt and a liquid binder.

3. A cold moldable composition comprising cement approximately 48%, asbestos and slate flour approximately 30%, and a fusible salt and waterglass solution approximately 22%.

4. A cold moldable composition comprising 78% of cement, asbestos and slate flour, and enough sodium fluoride and water to permit molding but normally prevent rapid drying and setting.

5. A cold moldable composition comprising approximately 48 parts of a coarse hydraulic cement, approximately 30 parts of slate flour and asbestos, and approximately 20 parts of a water solution containing waterglass.

6. A moldable insulating composition comprising approximately 48 parts of a coarse highly refractory hydraulic cement, approximately 30 parts of a very fine inert filler all mixed with approximately 20 parts of a water solution, and which at normal pressure and temperature is slow drying and nonsetting but which when highly compressed and slowly baked hardens and assumes a constant weight.

7. A cold moldable composition comprising a mixture of approximately 48% of high temperature hydraulic cement, approximately 30% of slate flour and other inert material, approximately 4% of a non-hygroscopic fusible salt, and approximately 18% of a water solution.

8. A cold moldable composition comprising coarse high temperature resisting hydraulic cement, slate flour, waterglass solution of approximately 1.38 specific gravity, a small percentage of asbestos, and sufficient non-hygroscopic fusible salt to prevent rapid setting under normal atmospheric conditions.

9. An article of manufacture composed of a high temperature hydraulic cement, asbestos fibre, slate flour, a fusible salt and a binder, and having the qualities of withstanding high temperature without weakening, and a non-conductor of electricity.

10. An article of manufacture comprising 35 to 61% of a highly refractory hydraulic cement, 43 to 17% of slate flour and asbestos, up to 8% of sodium fluoride and some sodium silicate, said article being a good electrical insulator, heat resisting, hard, and of constant weight.

11. A article of manufacture comprising a cold molded composition of approximately 50% of a coarse hydraulic cement, approximately 30% of a very fine inert filler and a small percent of a basic salt fused therewith, and having qualities of electrical insulation, heat resisting, and constant weight.

BRADFORD S. COVELL.